(12) United States Patent
Chung et al.

(10) Patent No.: US 8,799,593 B2
(45) Date of Patent: Aug. 5, 2014

(54) FLASH MEMORY DEVICES, DATA RANDOMIZING METHODS OF THE SAME, MEMORY SYSTEMS INCLUDING THE SAME

(75) Inventors: Jung Soo Chung, Seoul (KR); Yong June Kim, Seoul (KR); Hong Rak Son, Anyang-si (KR); Jun Jin Kong, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 43 days.

(21) Appl. No.: 13/237,350

(22) Filed: Sep. 20, 2011

(65) Prior Publication Data

US 2012/0166708 A1 Jun. 28, 2012

(30) Foreign Application Priority Data

Dec. 27, 2010 (KR) ........................ 10-2010-0135623

(51) Int. Cl.
*G06F 13/28* (2006.01)
*G06F 12/02* (2006.01)
(52) U.S. Cl.
CPC ................................ *G06F 12/0246* (2013.01)
USPC ....................................................... 711/157
(58) Field of Classification Search
CPC ................................................. G06F 12/0607
USPC .................. 711/103, 157, E12.092; 713/162; 714/762, 763; 365/185.02, 185.03
See application file for complete search history.

(56) References Cited

U.S. PATENT DOCUMENTS

| 4,744,104 | A  | * | 5/1988  | Pospischil ........................ 380/44  |
| 7,522,451 | B2 | * | 4/2009  | Chen ........................ 365/185.03   |
| 7,984,232 | B2 | * | 7/2011  | Kimura .......................... 711/103  |
| 8,127,200 | B2 | * | 2/2012  | Sharon et al. ................. 714/763   |
| 8,154,918 | B2 | * | 4/2012  | Sharon et al. ............. 365/185.02    |
| 8,321,760 | B2 | * | 11/2012 | Son et al. ....................... 714/763 |
| 2006/0271751 | A1 | * | 11/2006 | Chen et al. .................... 711/157 |
| 2009/0172266 | A1 |   | 7/2009  | Kimura                                   |
| 2009/0323942 | A1 |   | 12/2009 | Sharon et al.                            |
| 2010/0070681 | A1 |   | 3/2010  | Wan et al.                               |
| 2010/0083072 | A1 | * | 4/2010  | Prasad et al. .................. 714/762 |
| 2011/0099411 | A1 | * | 4/2011  | Lin ............................... 713/600 |

FOREIGN PATENT DOCUMENTS

JP 2004-040226 A 2/2004

* cited by examiner

*Primary Examiner* — April Y Blair
*Assistant Examiner* — Trang Ta
(74) *Attorney, Agent, or Firm* — Harness, Dickey & Pierce, P.L.C.

(57) ABSTRACT

Disclosed is a flash memory device which includes a memory cell array configured to store data, a randomizer configured to generate a random sequence, to interleave the random sequence using at least one of memory parameters associated with data to be programmed in the memory cell array, and a control logic circuit configured to provide the memory parameters to the randomizer and to control the randomizer.

18 Claims, 11 Drawing Sheets

FLASH MEMORY DEVICES, DATA RANDOMIZING METHODS OF THE SAME, MEMORY SYSTEMS INCLUDING THE SAME

CROSS-REFERENCE TO RELATED APPLICATIONS

This application claims the benefit, under 35 U.S.C. §119, of Korean Patent Application No. 10-2010-0135623 filed Dec. 27, 2010, the entire contents of which are herein incorporated by reference.

BACKGROUND

1. Field

Example embodiments relate to a semiconductor memory device, and more particularly, relate to a flash memory device.

2. Description of the Related Art

A semiconductor memory device may be a storage device which is formed by semiconductor silicon (Si), germanium (Ge), gallium arsenide (GaAs), indium phosphide (InP), or the like. Semiconductor memory devices can be divided into volatile memory devices and non-volatile memory devices.

Volatile memory devices may lose stored data at power-off. Volatile memory devices may include static random access memory (SRAM), dynamic RAM (DRAM), synchronous DRAM (SDRAM), and the like. Non-volatile memory devices may retain stored data even at power-off. Non-volatile memory devices may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. Flash memory may be either a NOR type or a NAND type.

SUMMARY

At least one aspect of example embodiments of inventive concepts is directed to provide a flash memory device which includes a memory cell array configured to store data, a randomizer configured to generate a random sequence, to interleave the random sequence using at least one of memory parameters associated with data to be programmed in the memory cell array, and a control logic circuit configured to provide the memory parameters to the randomizer and to control the randomizer.

In at least one example embodiment, the randomizer includes a sequence generator configured to generate the random sequence, an information generator configured to generate start point information based on at least one of the memory parameters, and an interleaver configured to interleave the random sequence by writing bits of the random sequence to a matrix in a first direction and reading the written bits in the matrix in a second direction.

In at least one example embodiment, a period of the random sequence is $(2^n-1)$ (n being an integer of 2 or more).

In at least on example embodiment, a size of the matrix corresponds to the period of the random sequence, and each of row and column sizes of the matrix area corresponds to a divisor of the period of the random sequence.

In at least one example embodiment, if the first direction is a row direction, the second direction is a column direction, and if the first direction is a column direction, the second direction is a row direction.

In at least one example embodiment, the randomizer includes a sequence generator configured to generate the random sequence, an information generator configured to generate skip point information and start point information based on at least one of the memory parameters, and an interleaver configured to interleave the random sequence by writing bits of the random sequence based on the skip point information, and reading the written bits of the matrix area from an intersection appointed by the start point information, the interleaver configured to read in a first direction and write in a second direction.

In at least one example embodiment, a period of the random sequence is $(2n-1)$ (n being an integer of 2 or more).

In at least one example embodiment, a size of the matrix is more than the period of the random sequence by 1, and each of row and column sizes of the matrix area corresponds to a divisor having a value more than the period of the random sequence by 1.

In at least one example embodiment, the interleaver is configured to reset the matrix before bits of the random sequence are written in the matrix.

In at least one example embodiment, the memory parameters include page information, word line information, memory block information, sector information, and erase count information.

In at least one example embodiment, the flash memory device further includes a de-randomizer configured to de-randomize data read from the memory cell array using at least one of memory parameters associated with the read data.

Another aspect of at least some example embodiments of inventive concepts is directed to provide a data randomizing method of a flash memory device which includes a memory cell array and a randomizer, the data randomizing method including generating a random sequence, interleaving the random sequence using at least one of memory parameters, and randomizing data to be programmed in the memory cell array by merging the interleaved sequence and the data to be programmed.

In at least one example embodiment, the interleaving includes generating start point information using the at least one of the memory parameters, writing bits of the random sequence in a matrix in a first direction, and reading the written bits of the matrix from an intersection in a second direction based on the start point information.

In at least one example embodiment, the interleaving includes generating skip point information and start point information using the at least one of the memory parameters, writing bits of the random sequence in a matrix in a first direction based on the skip point information, and reading the written bits of the matrix based on the start point information in a second direction.

In at least one example embodiment, the interleaving further includes resetting the matrix before bits of the random sequence are written in the matrix.

Still another aspect of at least some example embodiments of inventive concepts is directed to provide a memory system which includes a flash memory device, and a memory controller including a randomizer and configured to control the flash memory device. The randomizer generates a random sequence, interleaves the random sequence using at least one of memory parameters associated with data to be stored in the flash memory device, and randomizes the data to be programmed using the interleaved sequence.

In at least one example embodiment, the flash memory device includes another randomizer for randomizing the randomized data provided from the memory controller.

In at least one example embodiment, a period of the random sequence generated by the randomizer in the memory controller is different from a period of a random sequence generated by the another randomizer in the flash memory device.

In at least one example embodiment, the randomizer includes an interleaver which outputs the interleaved sequence by writing bits of the random sequence at a matrix area in a first direction and reading the written bits of the matrix area from an intersection, determined by at least one of the memory parameters, in a second direction.

At least another example embodiment discloses a memory device including a plurality of memory cells configured to store data, and a randomizer configured to read a random sequence from a matrix based on start point information, the start point information identifying coordinates of the matrix to start reading the random sequence from the matrix, the randomizer configured to randomize data to be stored in the plurality of memory cells based on the read random sequence.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Inventive concepts are described more fully hereinafter with reference to the accompanying drawings, in which example embodiments of inventive concepts are shown. Inventive concepts may, however, be embodied in many different forms and should not be construed as limited to example embodiments set forth herein. Rather, example embodiments are provided so that this disclosure will be thorough and complete, and will fully convey the scope of inventive concepts to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of inventive concepts. As used herein, the singular forms "a", "an" and "the" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

For ease of description, inventive concepts will be described with reference to a flash memory device. But, inventive concepts are not limited to the flash memory device. For example, inventive concepts may be applied non-volatile memory devices such as ROM, PROM, EPROM, EEPROM, MRAM, PRAM, RRAM, FRAM, and the like.

Figure 1:
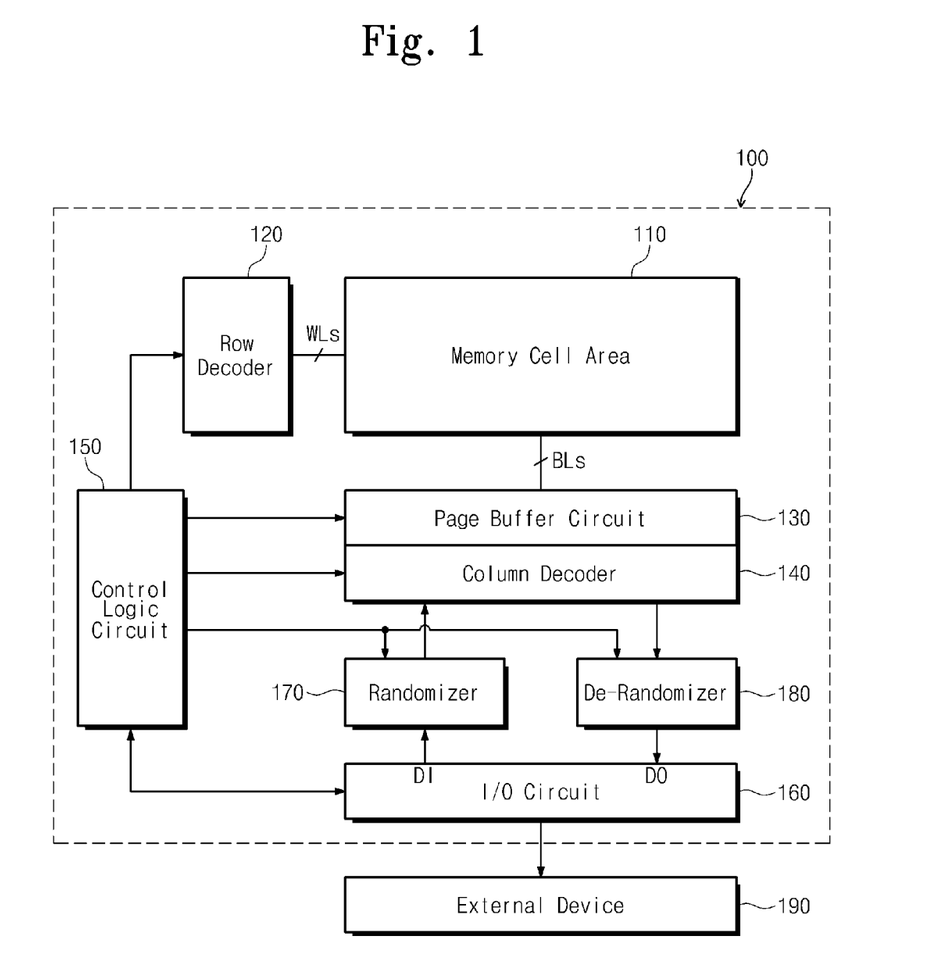
FIG. 1 is a block diagram of a flash memory device according to at least one example embodiment of inventive concepts.

FIG. 1 is a block diagram of a flash memory device according to at least one example embodiment of inventive concepts. Referring to FIG. 1, a flash memory device 100 may include a memory cell array 110, a row decoder 120, a page buffer circuit 130, a column decoder 140, a control logic circuit 150, an input/output circuit 160, a randomizer 170, and a de-randomizer 180.

Referring to FIG. 1, the memory cell array 110 may include memory cells arranged in a matrix form. The respective memory cells may store single-bit data or multi-bit (or, multi-level) data. That is, the memory cells may be formed of single-level cells (SLCs), multi-level cells (MLCs), or a combination of the SLCs and MLCs. The memory cell array 110 may be configured to have a single-layer array structure (or, called a two-dimensional array structure) or a multi-layer array structure (or, called a three-dimensional (or, vertical) array structure).

The row decoder 120 may operate responsive to the control of the control logic circuit 150. The row decoder 120 may be configured to conduct selecting and driving of word lines WLs coupled with the memory cell array 110.

The page buffer circuit 130 may operate responsive to the control of the control logic circuit 150. The page buffer circuit 130 may operate as a sense amplifier or as a write driver according to a mode of operation. For example, at reading, the page buffer circuit 130 may sense data from memory cells in a selected word line. At programming, the page buffer circuit 130 may write data in memory cells coupled with the selected word line. The page buffer circuit 130 may include page buffers corresponding to bit lines BLs, respectively. If each of the memory cells store multi-level data, each of the page buffers may be configured to have a plurality of latches.

The column decoder 140 may operate responsive to the control of the control logic circuit 150. The column decoder 140 may be configured to select bit lines BLs (or, the page buffers) coupled with the memory cell array 110. The column decoder 140 may select the bit lines BLs (or, page buffers) by a given unit at programming and reading.

The control logic circuit 150 may control an overall operation including program, erase, and read operations of the flash memory device 100. The control logic circuit 150 may control randomizing and de-randomizing of input and output data.

In at least one example embodiment, the control logic circuit 150 may provide the randomizer 170 and the de-randomizer 180 with memory parameters used for randomizing and de-randomizing operations at programming and reading. Herein, the memory parameters may include page information, word line information, memory block information, sector information, erase count information, and the like.

The input/output circuit 160 may transfer data provided from an external device 190 (e.g., a memory controller) into the randomizer 170. The input/output circuit 160 may transfer data provided from the de-randomizer into the external device 190.

The randomizer 170 may operate responsive to the control of the control logic circuit 150. The randomizer 170 may be configured to periodically generate a random sequence using a given seed value. The randomizer 170 may interleave a random sequence using at least one of memory parameters associated with program data provided from the control logic circuit 150. The randomizer 170 may randomize program data provided from the input/output circuit 160 using the interleaved random sequence. The randomizer 170 may transfer the randomized data into the column decoder 140.

The de-randomizer 180 may operate responsive to the control of the control logic circuit 150. The de-randomizer 180 may be configured to be identical to the randomizer 170 other than the following difference. The de-randomizer 180 may interleave a random sequence using at least one of memory parameters associated with read data provided from the control logic circuit 150. The de-randomizer 180 may de-randomize read data transferred from the column decoder 140 using the interleaved random sequence. That is, the de-randomizer 180 may recover data (i.e., randomized data) read from the memory cell array 110 to original data.

Random sequence interleaving methods of the randomizer 170 and the de-randomizer 180 will be more fully described with reference to FIGS. 5 to 8.

As described above, although a random sequence is generated according to a given seed value, the flash memory device 100 may interleave the random sequence to generate a new sequence as a bit stream in which '0' and '1' values are uniformly arranged in number. The flash memory device 100 may randomize data using the interleaved random sequence. This may enable data randomization to be improved. Further, to improve data randomization, the flash memory device 100 may interleave a random sequence using at least one of memory parameters associated with program data.

Figure 2:
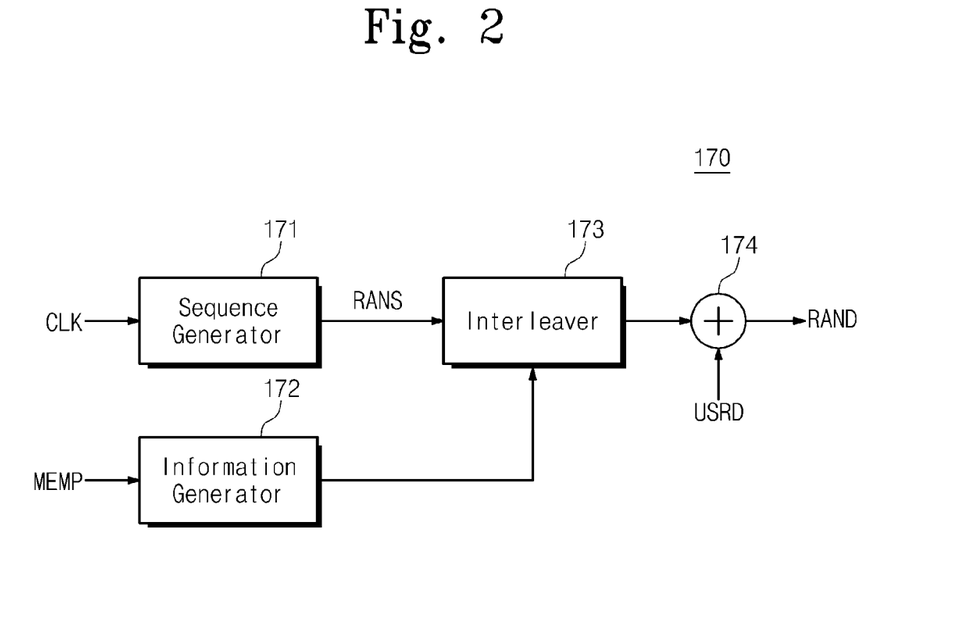
FIG. 2 is a block diagram of a randomizer illustrated in FIG. 1 according to at least one example embodiment.

FIG. 2 is an example block diagram of a randomizer illustrated in FIG. 1. Referring to FIG. 2, a randomizer 170 may include a sequence generator 171, an information generator 172, an interleaver 173, and a merger (or, called a mixer) 174.

The sequence generator 171 may generate a random sequence periodically using a given seed value. The sequence generator 171 will be more fully described with reference to FIG. 3.

The information generator 172 may generate start point information and skip point information using at least one of memory parameters MEMP associated with user data USRD transferred from an input/output circuit 160 (refer to FIG. 1), that is, data (or, program data) to be randomized. Herein, the start point information and the skip point information may be used to appoint an intersection of a matrix area of the interleaver 173, as information used to interleave a random sequence RANS. That is, the information generator 172 may convert at least one of the memory parameters MEMP into information appointing an intersection of the matrix area of the interleaver 173. For example, the information generator 172 may generate coordinates information of the intersection as the start point information through a modular operation on a page number of the user data USRD.

The interleaver 173 may interleave the random sequence RANS using at least one of the start point information and the skip point information provided from the information generator 172. A method of interleaving a random sequence will be more fully described with reference to FIGS. 5 to 8.

The merger 174 may logically combine a sequence interleaved by the interleaver 173 and the user data USRD transferred from the input/output circuit 160. For example, the merger 174 may generate randomized data RAND by exclusive ORing the interleaved sequence and the user data USRD. This means that the user data USRD is randomized according to the interleaved sequence.

Figure 3:
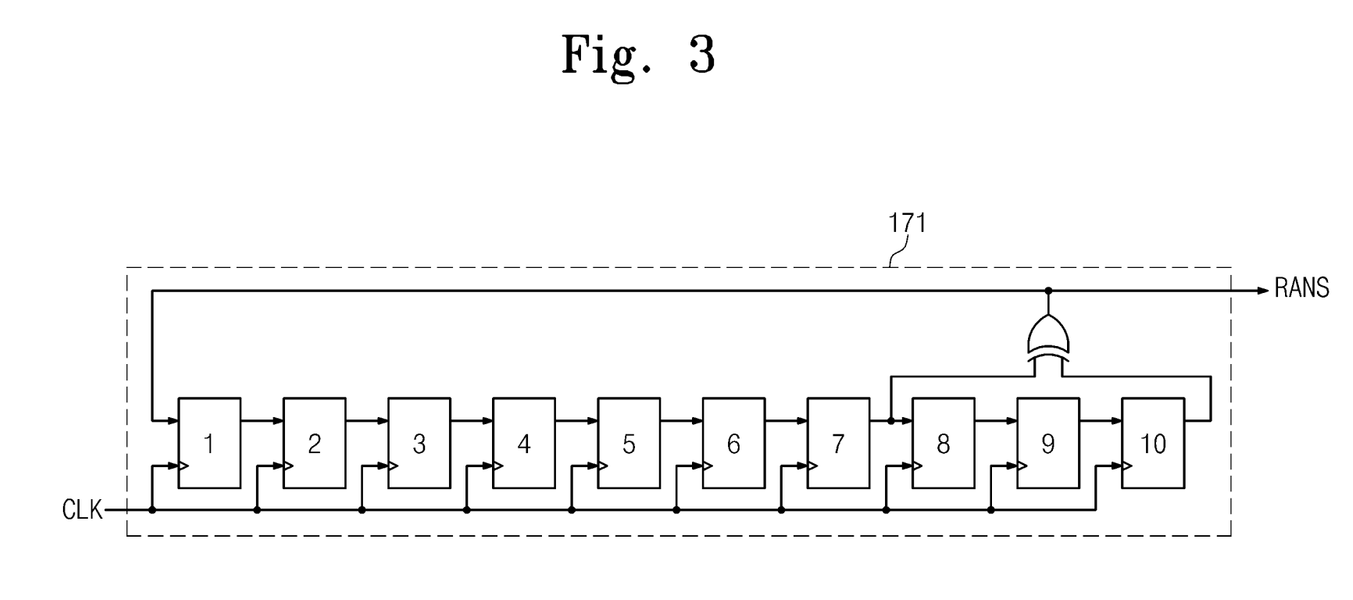
FIG. 3 is a block diagram of a sequence generator illustrated in FIG. 2 according to at least one example embodiment.

FIG. 3 is a block diagram of a sequence generator illustrated in FIG. 2.

Referring to FIG. 3, a sequence generator 171 may be implemented by a linear feedback shift register (LFSR) which includes a shift register and an XOR unit. But, the sequence generator 171 can be implemented by a pseudo-noise (PN) random sequence generator, a cyclic redundancy check (CRC) generator, and the like. The sequence generator 171 may be reset by a given seed value and generate a random sequence RANS having a predetermined period in synchronization with a clock signal CLK. The period of the random sequence RANS may be determined according to the number of sub-registers constituting a shift register. For example, as illustrated in FIG. 3, when the number of sub-registers is 10, an allowable maximum period of the random sequence RANS may be set to 1023 ($=2^{10}-1$).

Figure 4:
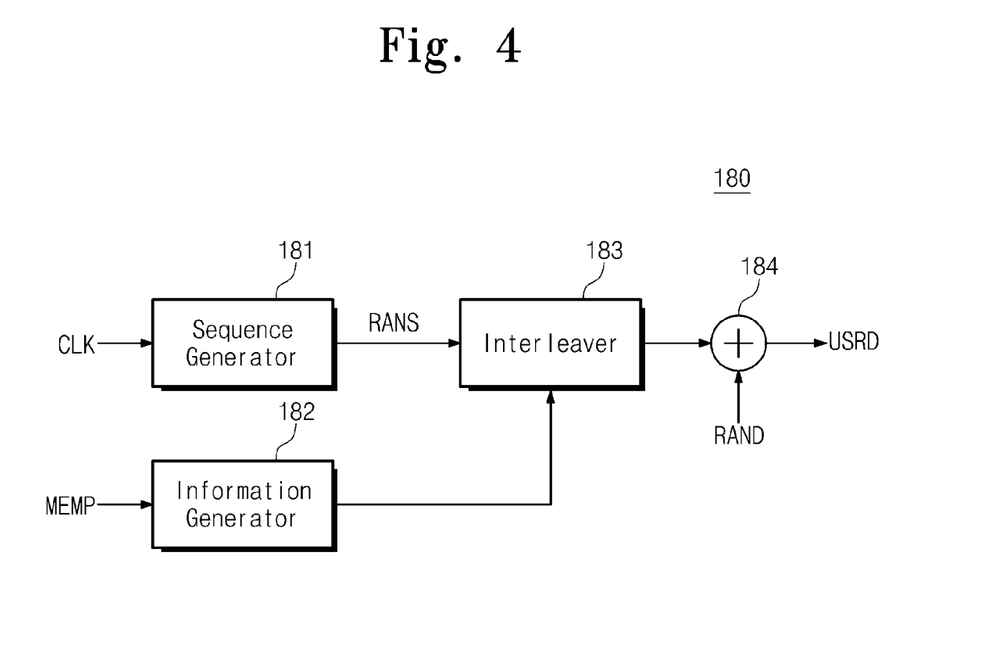
FIG. 4 is a block diagram of a de-randomizer illustrated in FIG. 1 according to at least one example embodiment.

FIG. 4 is a block diagram of a de-randomizer illustrated in FIG. 1.

Referring to FIG. 4, a de-randomizer 180 may be configured to be identical to a randomizer 170 except that randomized data RAND is provided to a merger 184 instead of user data USRD. For example, the merger 184 may generate user data USRD by exclusive-ORing interleaved sequence and randomized data RAND. This means that randomized data RAND is de-randomized by interleaved sequence (or, it is recovered to user data USRD as original data being not randomized).

Figure 5:
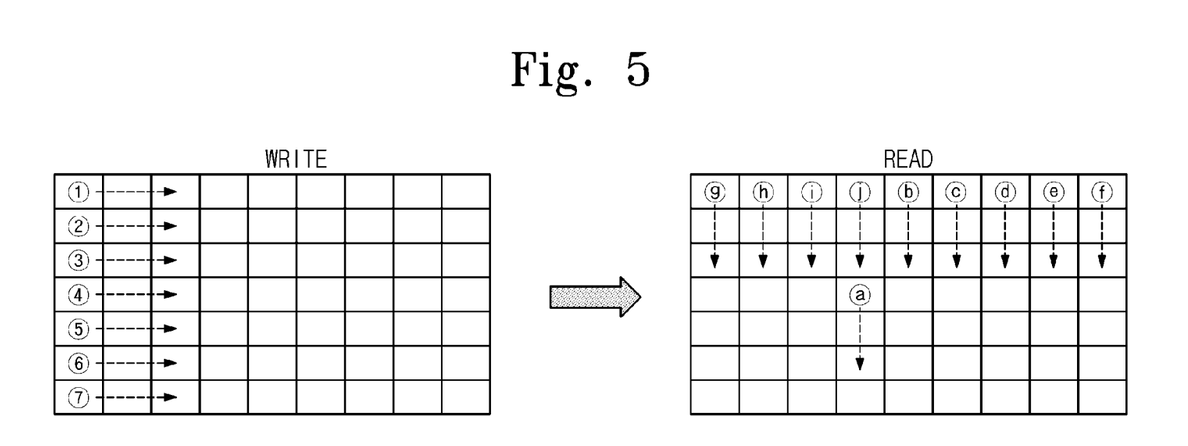
FIG. 5 is a diagram for describing an interleaving method according to at least one example embodiment of inventive concepts.

FIG. 5 is a diagram for describing an interleaving method according to at least one example embodiment of inventive concepts. In FIG. 5, there are illustrated the read and write orders of a random sequence RANS (refer to FIG. 2) provided from a sequence generator 171 (refer to FIG. 2).

In case of an interleaving method, a size of a matrix area may correspond to the period of the random sequence RANS. A row number and a column number of the matrix area may correspond to a divisor of the period of the random sequence RANS. For example, it is assumed that the period of the random sequence RANS is ($2^n-1$). In this case, ($2^n-1$) may be represented by ($2^m-1$)×($2^m+1$) (n=2m, i.e., n being an even number). Herein, ($2^m-1$) may indicate a row size, and ($2^m+1$) may indicate a column size. Alternatively, ($2^m+1$) may indicate a row size, and ($2^m-1$) may indicate a column size. Below, it is assumed that the period of the random sequence RANS is set to 63 ($2^6-1$), a row size to 7 ($2^3-1$), and a column size to 9 ($2^3+1$).

The interleaver 173 (refer to FIG. 2) may write bits of the random sequence RANS at each row (represented by ①  to ⑦) of matrix area sequentially in a row direction. At this time, each column of the matrix area may be formed of a sub random sequence having a period of ($2^m-1$). One of the sub random sequences may be formed of only a '0' bit. Then, the interleaver 173 may sequentially read bits of each column (represented by ⓐ to ⓙ), written in the matrix area, from an intersection which is appointed by start point information from an information generator 172 (refer to FIG. 2). Herein, it is assumed that the coordinates of the intersection appointed by the start point information is (4, 4). The interleaver 173 may output one period of an interleaved sequence according to the above-described manner.

Meanwhile, the interleaver 173 can be configured to sum bits by the column before bits are read in a column direction. The interleaver 173 may read bits in remaining columns other than a column having a sum of '0', based on results calculated by the column.

Figure 6:
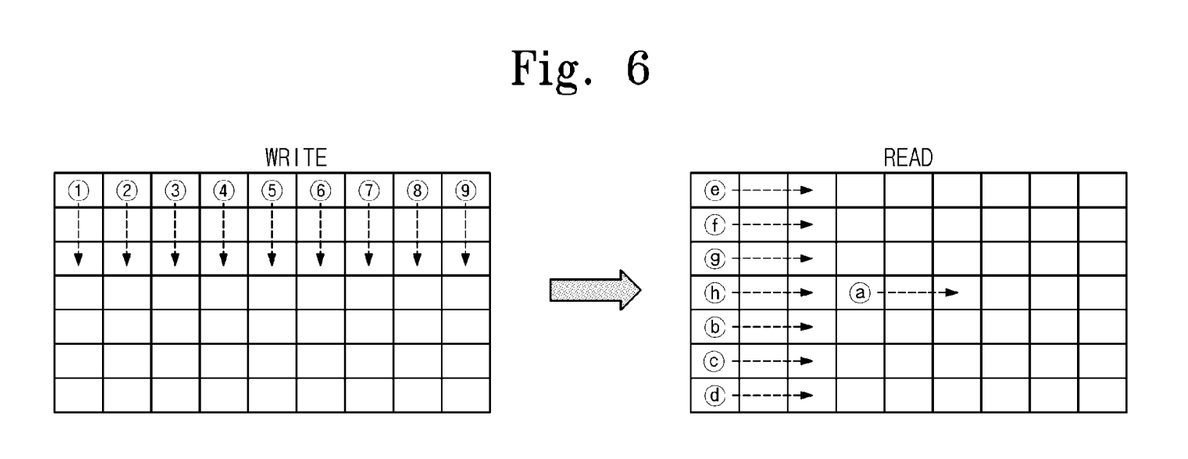
FIG. 6 is a diagram for describing an interleaving method according to at least one example embodiment of inventive concepts.

FIG. 6 is a diagram for describing an interleaving method according to at least another example embodiment of inventive concepts. Below, a difference between interleaving methods according to FIGS. 5 and 6 will be described for ease of description.

Referring to FIG. 6, an interleaver 173 (refer to FIG. 2) may sequentially write bits of a random sequence RANS at each column (represented by ① to ⑨) of matrix area in a column direction. Then, the interleaver 173 may sequentially read bits of each row (represented by ⓐ to ⓗ), written in the matrix area, from an intersection which is appointed by start point information from an information generator 172 (refer to FIG. 2). Herein, it is assumed that the coordinates of the intersection appointed by the start point information is (4, 4). The interleaver 173 may output one period of an interleaved sequence according to the above-described manner.

Meanwhile, the interleaver 173 can be configured to sum bits by the row before bits are read in a row direction. The interleaver 173 may read bits in remaining rows other than a row having a sum of '0', based on results calculated by the row.

Figure 7:
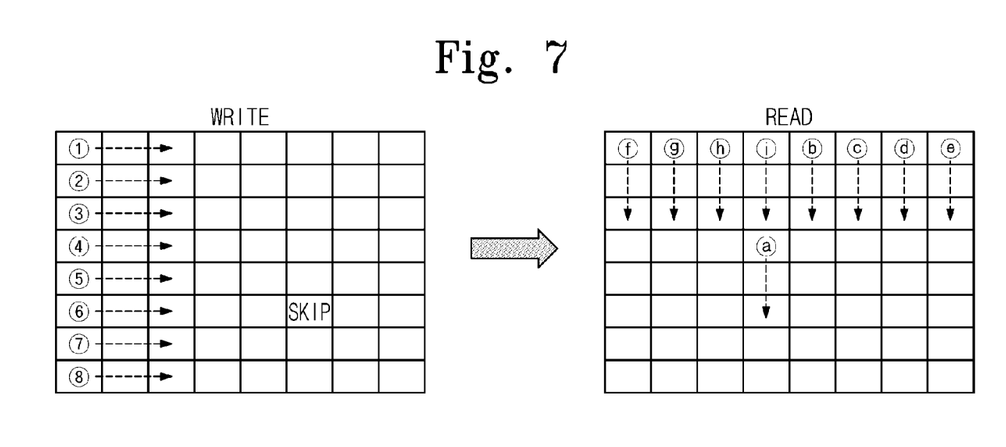
FIG. 7 is a diagram for describing an interleaving method according to at least one example embodiment of inventive concepts.

FIG. 7 is a diagram for describing an interleaving method according to at least another example embodiment of inventive concepts. In FIG. 7, there are illustrated the write and read orders of a random sequence RANS (refer to FIG. 2) provided from a sequence generator 171 (refer to FIG. 2).

With an interleaving method of FIG. 7, a size of a matrix area may correspond to a value less by 1 than the period of the random sequence RANS. The size of the matrix area may be determined to divide a row size and a column size when the period of the random sequence RANS has a prime number. Herein, each of row and column sizes of the matrix area may correspond to a divisor having a value more by 1 than the period of the random sequence RANS. That is, the row size of the matrix area may be identical to the column size thereof.

For example, in a case where the period of a random sequence is ($2^1-1$) and is not a prime number, a matrix size may be set to $2^m \times 2^m$ (n=2m, m being an integer). Since $2^n$ is represented by $2^m \times 2^m$, each of the row and column sizes may be set to $2^m$. Herein, it is assumed that the period of the random sequence RANS is set to 63 ($2^6-1$), a matrix size to 63 ($2^6$), a row size to 8 ($2^3$), and a column size to 8 ($2^3$).

In at least another example embodiment, in a case where the period of a random sequence is ($2^n-1$) and is a prime number, a matrix size may be set to $2^n = 2^{2m+1}$ (n=2m+1, m being an integer). Since $2^n$ is represented by $2^m \times 2^{m+1}$, the row and column sizes may be set to $2^m$ and $2^{m+1}$, respectively. Herein, it is assumed that the period of the random sequence RANS is set to 127 ($2^7-1$), a matrix size to 128 ($2^7$), a row size to 8 ($2^3$), and a column size to 16 ($2^4$).

The interleaver 173 may sequentially write bits of a random sequence RANS in a row direction at an area of the matrix area other than an area appointed by skip point information provided from an information generator 172 (refer to FIG. 2). In order to prevent an intersection SKIP appointed by the skip point information from being set by an undesired value, the interleaver 173 can reset the matrix area to a value of '0' or '1' before bits of a random sequence are written at the matrix area.

Then, the interleaver 173 may sequentially read bits of each column (represented by ⓐ to ⓙ), written in the matrix area, from an intersection which is appointed by start point information from an information generator 172 (refer to FIG. 2). Herein, it is assumed that the coordinates of the intersection appointed by the start point information is (4, 4). The interleaver 173 may output one period of an interleaved sequence according to the above-described manner. In this case, the period of an interleaved sequence may be more by 1 than the period of a random sequence RANS.

Figure 8:
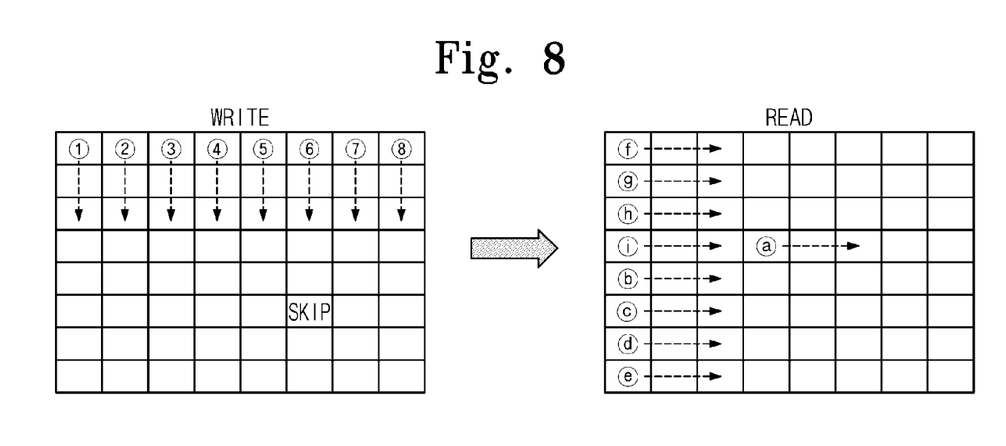
FIG. 8 is a diagram for describing an interleaving method according to at least one example embodiment of inventive concepts.

FIG. 8 is a diagram for describing an interleaving method according to at least another example embodiment of inventive concepts. Below, a difference between interleaving methods according to FIGS. 7 and 8 inventive concepts will be described for ease of description.

Referring to FIG. 8, an interleaver 173 (refer to FIG. 2) may sequentially write bits of a random sequence RANS at each column (represented by ① to ⑧) within an area of matrix area other than an area appointed by skip point information provided from an information generator 172. Then, the interleaver 173 may sequentially read bits of each row (represented by ⓐ to ⓘ), written in the matrix area, from an intersection which is appointed by start point information from an information generator 172 (refer to FIG. 2). Herein, it is assumed that the coordinates of the intersection appointed by the start point information is (4, 4). The interleaver 173 may output one period of an interleaved sequence according to the above-described manner. In this case, the period of an interleaved sequence may be more by 1 than the period of a random sequence RANS.

Figure 9:
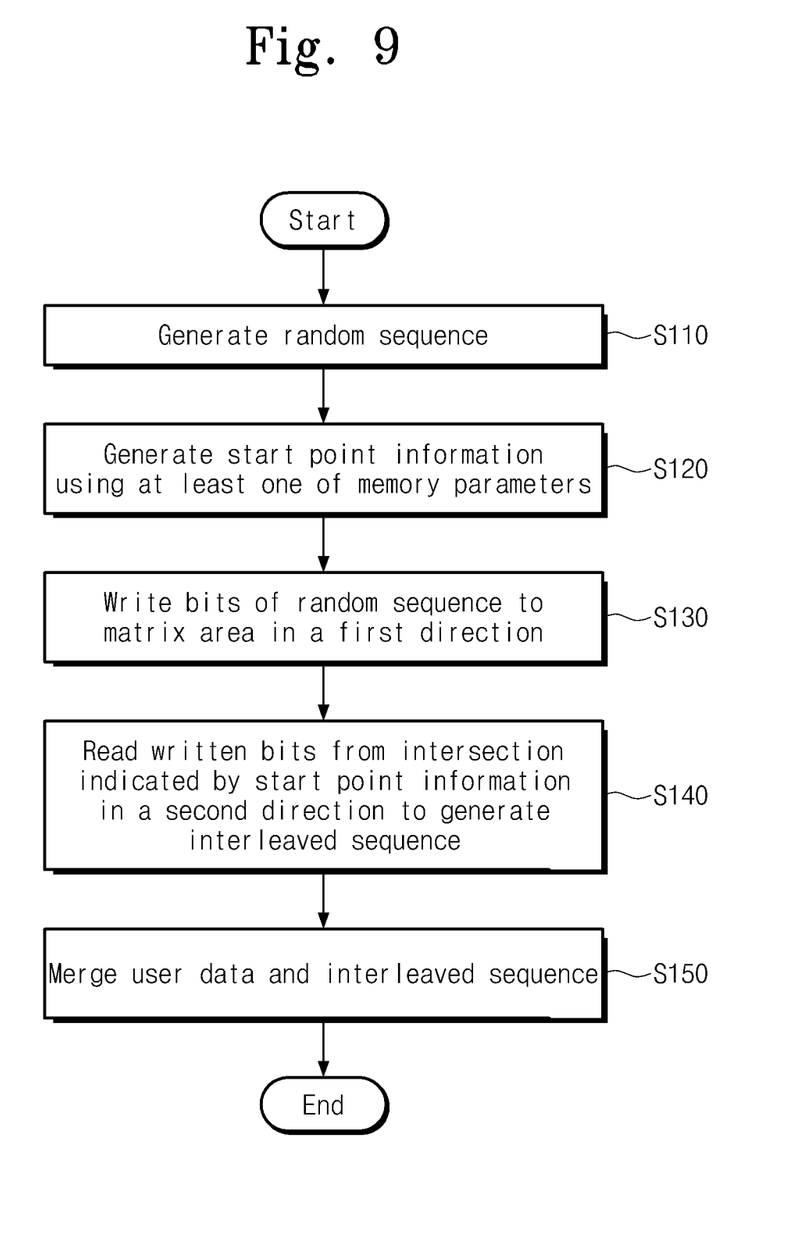
FIG. 9 is an example flow chart of a data randomizing method of a flash memory device according to at least one example embodiment of inventive concepts.

FIG. 9 is an example flow chart of a data randomizing method of a flash memory device according to FIGS. 5 and 6. Referring to FIG. 9, in operation S110, a period of a random sequence may be generated according to a given seed value. The random sequence may be produced by the above-described linear feedback shift register.

In operation S120, start point information may be converted from at least one of memory parameters associated with data to be randomized. As described above, the memory parameters may include page information, word line information, memory block information, sector information, erase count information, and the like.

The random sequence may be interleaved through operations S130 and S140. The random sequence may be interleaved by writing bits of the random sequence at a matrix area in the first direction in operation S130 and reading the written bits in the matrix area in the second direction from an intersection appointed by start point information in operation S140. Herein, the first direction may be a row direction and the second direction may be a column direction. Alternatively, the first direction may be a column direction and the second direction may be a row direction. That is, an operation of interleaving a random sequence may be carried out such that a bit writing direction is different from a bit reading direction.

In operation S150, user data may be exclusive-ORed with the interleaved sequence. That is, randomized data may be produced according to the interleaved sequence. Meanwhile, the operations S110 to S150 may be repeated every period.

Figure 10:
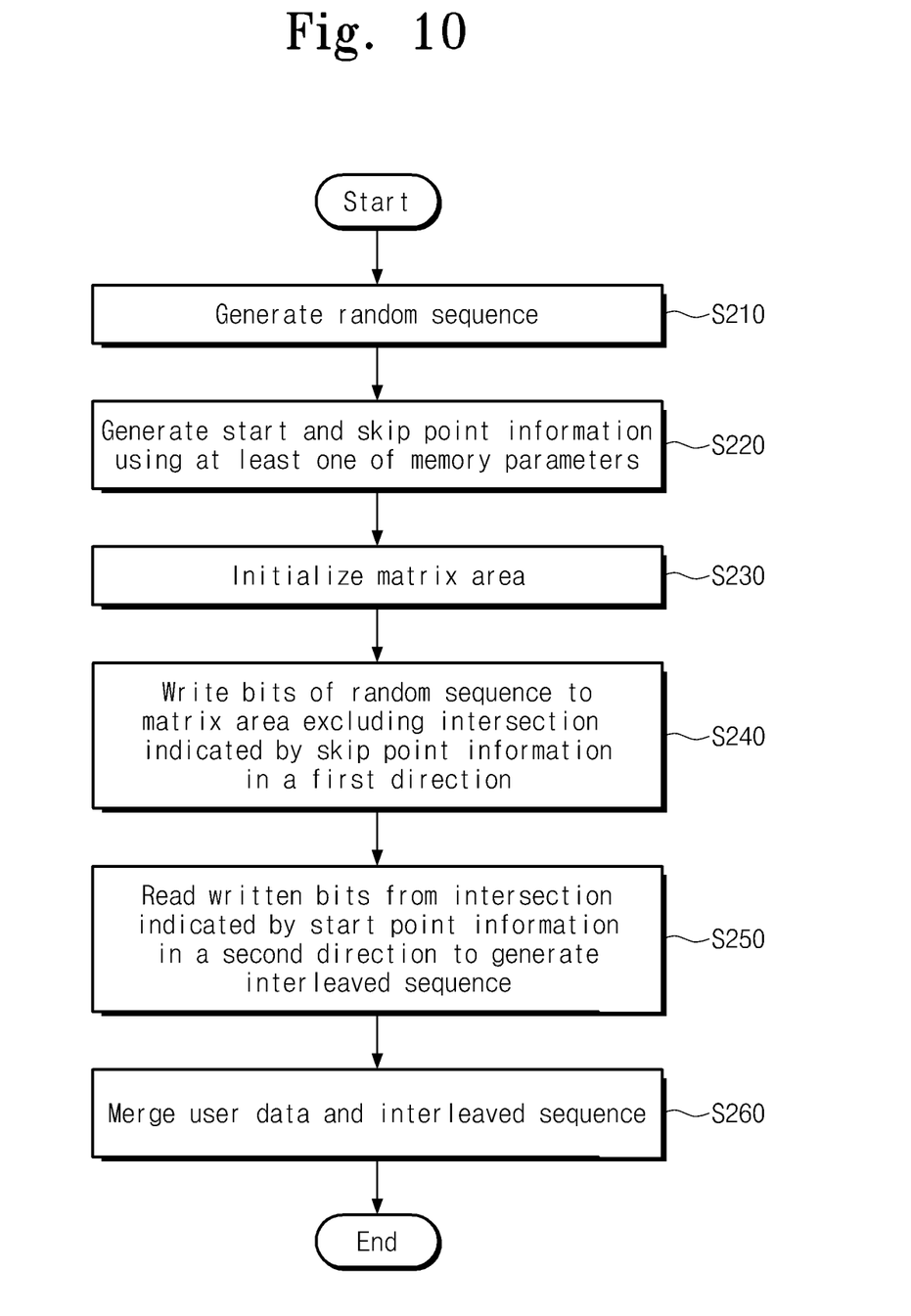
FIG. 10 is an example flow chart of a data randomizing method of a flash memory device according to at least one embodiment of inventive concepts.

FIG. 10 is an example flow chart of a data randomizing method of a flash memory device according to FIGS. 7 and 8. Below, a difference between randomizing methods according to FIGS. 9 and 10 will be described for ease of description.

Referring to FIG. 10, in operation S210, a period of a random sequence may be generated according to a given seed value. In operation S220, start point information and skip point information may be generated using at least one of memory parameters associated with data to be randomized. In operation S230, a matrix area may be reset to a value of '0' or '1' to prevent an intersection SKIP appointed by the skip point information from being set by an undesired value.

The random sequence may be interleaved through operations S240 and S250. The random sequence may be interleaved by writing bits of the random sequence in the first direction at an area of a matrix area other than an intersection appointed by the skip point information in operation S240 and reading the written bits in the matrix area in the second direction from an intersection appointed by the start point information in operation S250. Herein, the first direction may be a row direction and the second direction may be a column direction. Alternatively, the first direction may be a column direction and the second direction may be a row direction.

In operation S260, user data may be exclusive-ORed with the interleaved sequence. That is, randomized data may be produced according to the interleaved sequence. Meanwhile, the operations S210 to S260 may be repeated every period.

Figure 11:
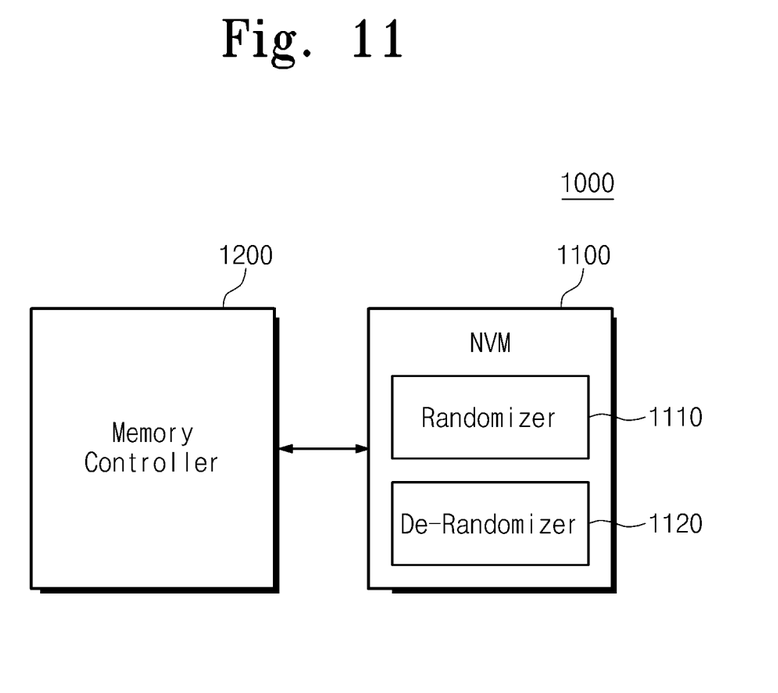
FIG. 11 is an example block diagram of a memory system according to at least one example embodiment of inventive concepts.

FIG. 11 is a block diagram of a memory system according to at least one example embodiment of inventive concepts. Referring to FIG. 11, a memory system 1000 may include a flash memory device 1100 and a memory controller 1200.

The flash memory device 1100 and the memory controller 1200 may be included within one storage device. The storage device may include a portable (or, handheld) storage device such as an USB memory, a memory card (MMC, SD, xD, CF, or SIM card), and the like. Further, the storage device may be coupled with a host such as a computer, a notebook, a digital camera, a cellular phone, an MP3 player, a PMP, a game console, or the like.

The flash memory device 1100 may include a randomizer 1110 and a de-randomizer 1120 and operate responsive to the control of the memory controller 1200.

The randomizer 1110 may generate a random sequence using a given seed value. The randomizer 1110 may interleave the random sequence using at least one of memory parameters associated with program data. The randomizer 1110 may randomize the program data using the interleaved sequence.

The de-randomizer 1120 may be configured to be identical to the randomizer 1110 except the following difference. That is, the de-randomizer 1120 may interleave the random sequence using at least one of memory parameters associated with read data. The de-randomizer 1120 may de-randomize randomized data read from a memory cell array 110 to output original data.

The memory controller 1200 may control an overall operation of the flash memory device 1100. Although not shown in FIG. 11, the memory controller 1200 may include constituent elements such as a flash interface, a host interface, an ECC circuit, a CPU, a buffer memory, and the like.

Figure 12:
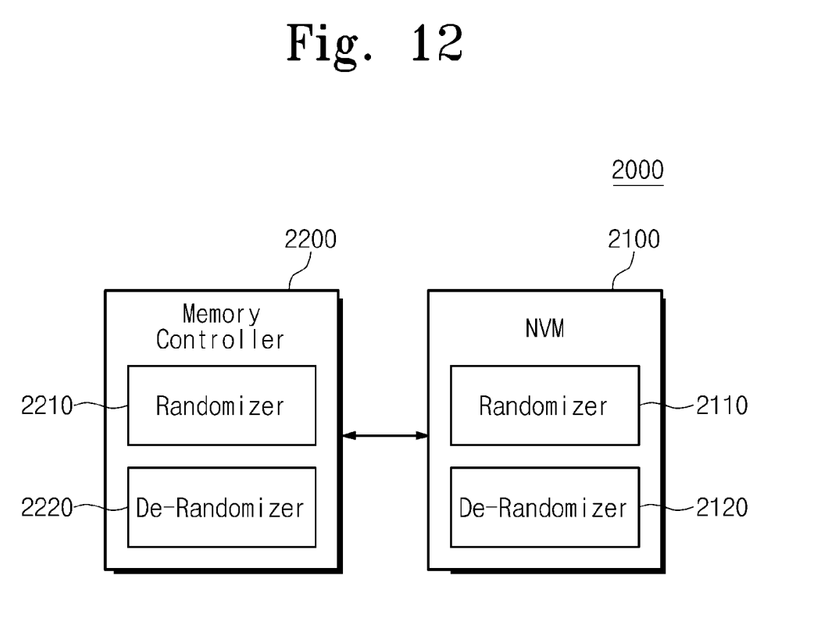
FIG. 12 is a block diagram of a memory system according to at least one example embodiment of inventive concepts.

FIG. 12 is a block diagram of a memory system according to at least one example embodiment of inventive concepts.

Referring to FIG. 12, a memory system 2000 may include a flash memory device 2100 and a memory controller 2200. The flash memory device 2100 may include a first randomizer 2110 and a first de-randomizer 2120. The memory controller 2200 may include a second randomizer 2210 and a second de-randomizer 2220. Herein, the first and second randomizers 2110 and 2210 may be configured to be identical to each other. The first and second de-randomizers 2120 and 2220 may be configured to be identical to each other. A period of a random sequence generated from the first randomizer 2110 may be different from a period generated from the second randomizer 2210. Further, a period of a random sequence generated from the first de-randomizer 2120 may be different from a period generated from the second de-randomizer 2220.

Figure 13:
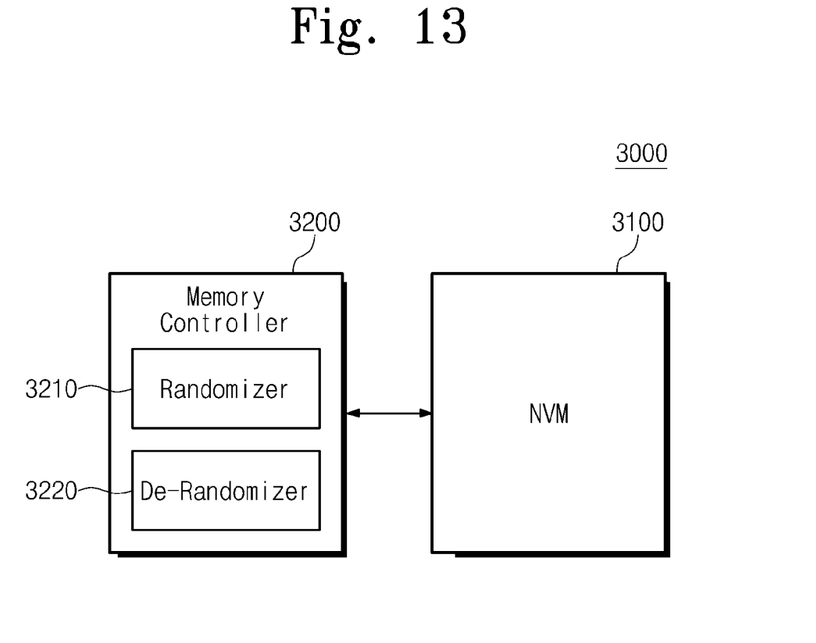
FIG. 13 is a block diagram of a memory system according to at least one example embodiment of inventive concepts.

FIG. 13 is a block diagram of a memory system according to at least another example embodiment of inventive concepts.

Referring to FIG. 13, a memory system 3000 may include a flash memory device 3100 and a memory controller 3200. The memory controller 3200 may include a randomizer 3210 and a de-randomizer 3220. The memory controller 3200 may randomize data to be provided to the flash memory device 3100 using the randomizer 3210 and de-randomize data transferred from the flash memory device 3100 using the de-randomizer 3220.

Figure 14:
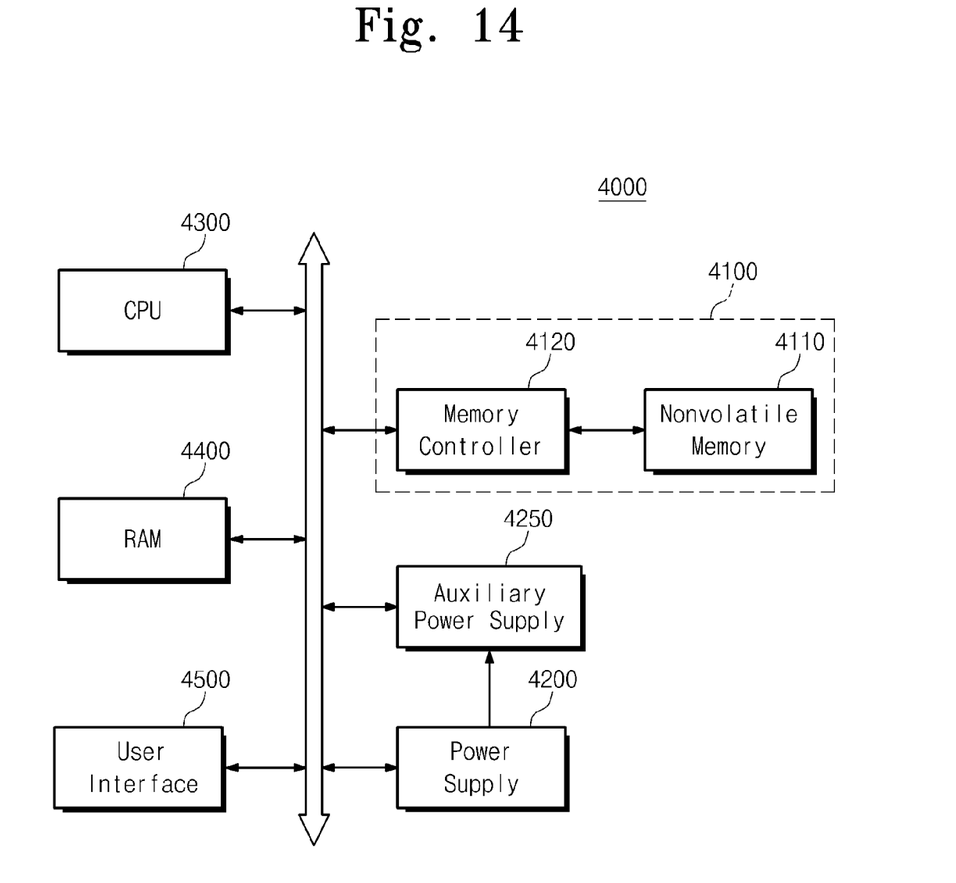
FIG. 14 is a block diagram of an electronic device including a flash memory device according to at least one example embodiment of inventive concepts.

FIG. 14 is a block diagram of an electronic device including a flash memory device according to at least another example embodiment of inventive concepts. Herein, an electronic device 4000 may be a personal computer, a notebook computer, a cellular phone, a PDA, a camera, and the like.

Referring to FIG. 14, the electronic device 4000 may include a memory system 4100, a CPU 4300, a RAM 4400, and a user interface 4500. The memory system 4100 may include a flash memory 4110 and a memory controller 4120. A memory system (e.g., 1000 to 3000) (referring to FIGS. 11-13) may be applied to the memory system 4100 of the electronic device 4000.

A flash memory device and/or a memory controller according to inventive concepts may be packed using various types of packages such as PoP (Package on Package), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

With example embodiments of inventive concepts, although a random sequence is generated on the basis of a given seed value, data randomization may be improved by interleaving the random sequence using memory parameters and randomizing data using the interleaved sequence.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A flash memory device comprising:
a memory cell array configured to store data;
a randomizer configured to generate a random sequence and interleave the random sequence using at least one of memory parameters associated with data to be programmed in the memory cell array, the randomizer includes,
a sequence generator configured to generate the random sequence,
an information generator configured to generate start point information based on the at least one of the memory parameters, the start point information identifying first coordinates of a matrix, and
an interleaver configured to interleave the random sequence by writing bits of the random sequence to the matrix in a first direction starting at second coordinates of the matrix and reading the written bits in the matrix in a second direction based on the start point information, the first and second coordinates being different and of the same matrix; and
a control logic circuit configured to provide the memory parameters to the randomizer and to control the randomizer.

2. The flash memory device of claim 1, wherein a period of the random sequence is $(2^n-1)$, where n is an integer of 2 or more.

3. The flash memory device of claim 2, wherein a size of the matrix corresponds to the period of the random sequence, and each of row and column sizes of the matrix corresponds to a divisor of the period of the random sequence.

4. The flash memory device of claim 1, wherein if the first direction is a row direction, the second direction is a column direction, and if the first direction is a column direction, the second direction is a row direction.

5. The flash memory device of claim 1, wherein
the information generator is configured to generate skip point information based on the at least one of the memory parameters, the skip point information identifying coordinates of a matrix; and
the interleaver is configured to interleave the random sequence by writing bits of the random sequence to the matrix based on the skip point information.

6. The flash memory device of claim 5, wherein a period of the random sequence is $(2^n-1)$, where n is an integer of 2 or more.

7. The flash memory device of claim 6, wherein a size of the matrix is more than the period of the random sequence by 1, and each of row and column sizes of the matrix corresponds to a divisor having a value more than the period of the random sequence by 1.

8. The flash memory device of claim 5, wherein the interleaver is configured to reset the matrix before bits of the random sequence are written in the matrix.

9. The flash memory device of claim 1, wherein the memory parameters include page information, word line information, memory block information, sector information, and erase count information.

10. The flash memory device of claim 1, further comprising:
a de-randomizer configured to de-randomize data read from the memory cell array based on at least one of memory parameters associated with the read data.

11. A data randomizing method of a flash memory device which includes a memory cell array and a randomizer, the data randomizing method comprising:
generating a random sequence;
interleaving the random sequence, the interleaving including,
generating start point information, the start point information identifying first coordinates of a matrix,
writing bits of the random sequence in the matrix in a first direction starting at second coordinates of the matrix, and
reading the written bits of the matrix in a second direction based on the start point information, the first and second coordinates being different and of the same matrix; and
randomizing data to be programmed in the memory cell array by merging the interleaved sequence and the data to be programmed.

12. The data randomizing method of claim 11, wherein the interleaving comprises:
generating skip point information the skip point information identifying coordinates of a matrix;
writing bits of the random sequence in the matrix in a first direction based on the skip point information.

13. The data randomizing method of claim 12, wherein the interleaving further comprises:
resetting the matrix before bits of the random sequence are written in the matrix.

14. A memory device comprising:
a plurality of memory cells configured to store data;
an interleaver configured to interleave a random sequence based on start point information, the interleaving including writing the random sequence to a matrix in a first direction starting at first coordinates of the matrix and reading the random sequence in a second direction; and
a randomizer configured to read the random sequence from the matrix based on the start point info information, the start point information identifying second coordinates of the matrix to start reading the random sequence from the matrix, the first and second coordinates being different and of the same matrix, the randomizer configured to randomize data to be stored in the plurality of memory cells based on the read random sequence.

15. The memory device of claim 14, further comprising:
a control logic circuit configured to provide at least one memory parameter, the start point information being based on the at least one memory parameter.

16. The memory device of claim 15, wherein the randomizer includes:
a sequence generator configured to generate the random sequence; and
an information generator configured to generate the start point information based on the at least one memory parameter.

17. The memory device of claim 15, wherein the randomizer is configured to generate skip point information based on the at least one memory parameter and the randomizer is configured to write the random sequence to the matrix based on the skip point information, the skip point information indicating coordinates of the matrix to be skipped during the writing.

18. The memory device of claim 17, wherein the randomizer is configured to write the random sequence to the matrix in a first direction and is configured to read the random sequence from the matrix in a second direction.

* * * * *